United States Patent [19]
Yoshioka

[11] 4,193,753
[45] Mar. 18, 1980

[54] APPARATUS FOR AUTOMATICALLY PRODUCING FLOWER-SHAPED DECORATIONS

[76] Inventor: Sunao Yoshioka, 576,, Oaza-Umebayashi, Nishi-ku, Fukuoka, Japan

[21] Appl. No.: 973,985

[22] Filed: Dec. 28, 1978

[51] Int. Cl.² .............................. B29F 3/04; B29F 3/06
[52] U.S. Cl. ..................................... 425/311; 425/325; 425/376 B; 425/382 R; 425/377; 425/436 R; 425/447; 425/464
[58] Field of Search ............... 425/310, 311, 314, 316, 425/324.1, 325, 376 B, 376 R, 382 R, 380, 377, 436 R, 447, 461, 463, 464, 308; 426/516

[56] References Cited
U.S. PATENT DOCUMENTS

| | | | |
|---|---|---|---|
| 1,765,872 | 6/1930 | Laskey | 426/516 |
| 1,817,383 | 8/1931 | Laskey | 426/516 |
| 3,976,799 | 8/1976 | Kelley | 426/516 |

Primary Examiner—W. E. Hoag
Attorney, Agent, or Firm—Frank J. Jordan

[57] ABSTRACT

An apparatus of this invention can automatically produce flower-shaped decorations which may be used to decorate cakes. The apparatus substantially is characterized by a flower forming mechanism which comprises a cylinder into which a desired amount of raw material such as cream is charged, a pattern plate provided with a plurality of inclined apertures, a piston rod which extrudes the raw material through the pattern plate, means to form a stem portion of the flower and means to cut off the flower.

2 Claims, 15 Drawing Figures

FIG. 13

APPARATUS FOR AUTOMATICALLY PRODUCING FLOWER-SHAPED DECORATIONS

BACKGROUND OF INVENTION

This invention relates to an apparatus for automatically producing flower-shaped decorations on cakes.

Conventionally, various kinds of decorations which are placed on cakes are manually produced by skilled laborers. Accordingly, such production method is time-consuming and laborious.

It is an object of the present invention to provide an apparatus which can automatically produce decorations of desired shapes without necessitating skilled laborers.

DETAILED DESCRIPTION OF THE DISCLOSURE

The apparatus of this invention is described hereinafter in view of two embodiments.

First Embodiment

In this embodiment, a circular casing 2 is secured to a frame structure 1. In the casing 2, a cylinder 3 is encased in an upright position. The cylinder 3 has an opening 5 which intermittently communicates with a raw material supply tank 4 which is tiltably mounted on the frame structure 1. A piston rod 6 is elevatably disposed in the cylinder 3, which is provided with the desired flower-shaped pattern plate 7 on the upper end thereof. A pair of stem-forming plates 8, 9 which open or close the upper surface of the casing 2 is mounted on the casing 2 and above the pattern plate 7. A pair of cutting-off plates 10, 11 are also mounted perpendicularly to the respective stem-forming plates 8,9 on the casing 2 and effect the closing or opening movement.

In the drawings, numeral 12 indicates a power-operated motor with a reducing device, numeral 13 indicates a power transmission shaft which receives a drive force from the motor 12 by way of chains 14 and sprocket 14a, 14b, numeral 15 indicates a central tilting lever which receives the drive force from the power transmission shaft 13 at the middle portion thereof by way of a cam mechanism 16.

Figure 7:
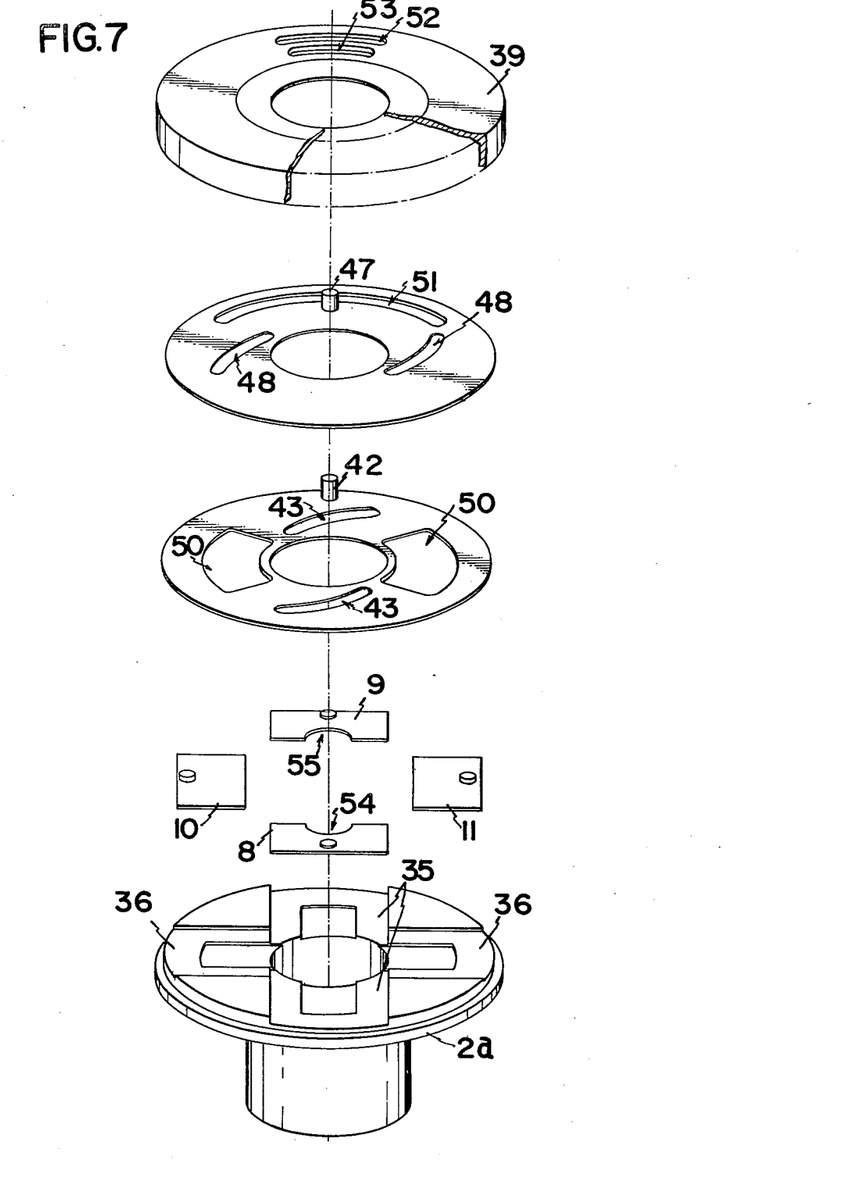
FIG. 7 is an explanatory view of the drive mechanism for actuating the stem-forming plates and cutting plates explaining the manner of assembling.
Figure 8:
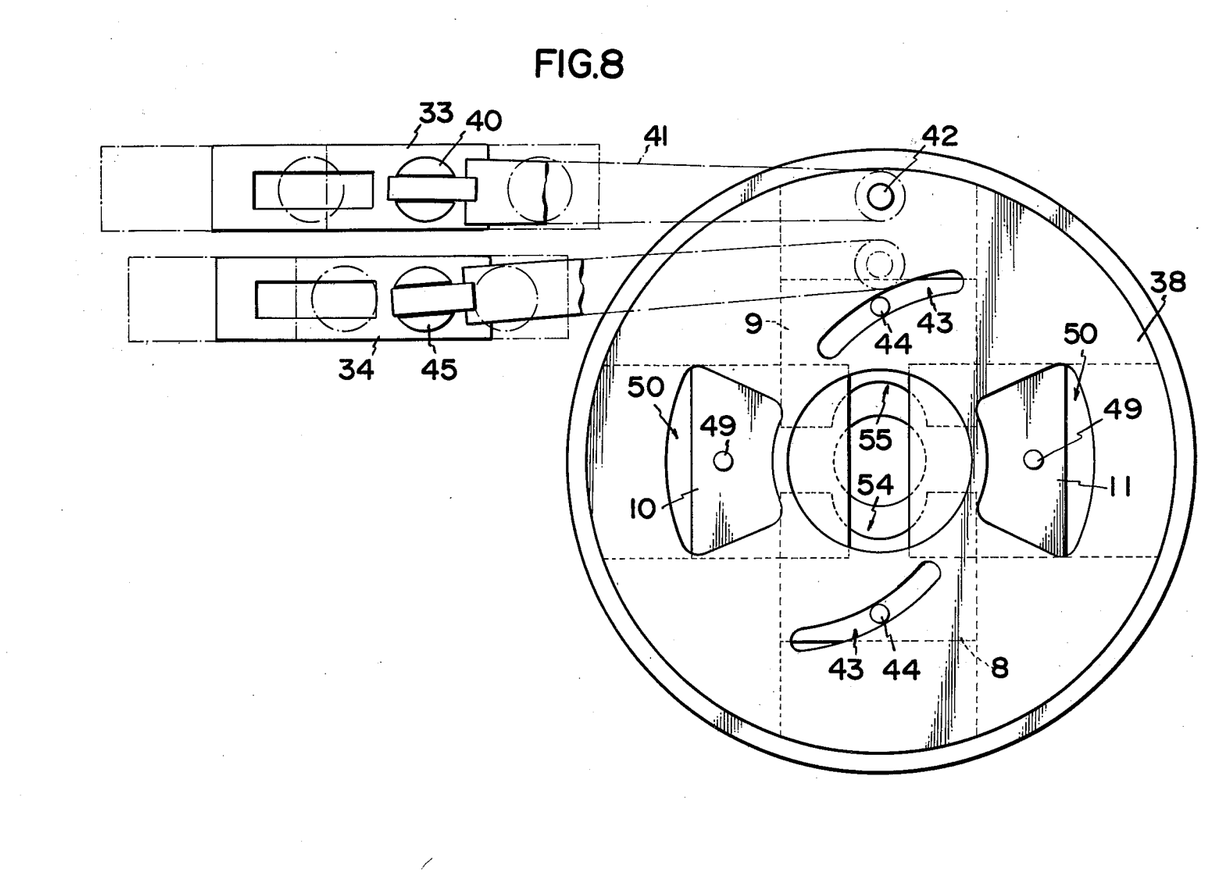
FIG. 8 is an explanatory view explaining the manner of operating the stem-forming plates.
Figure 9:
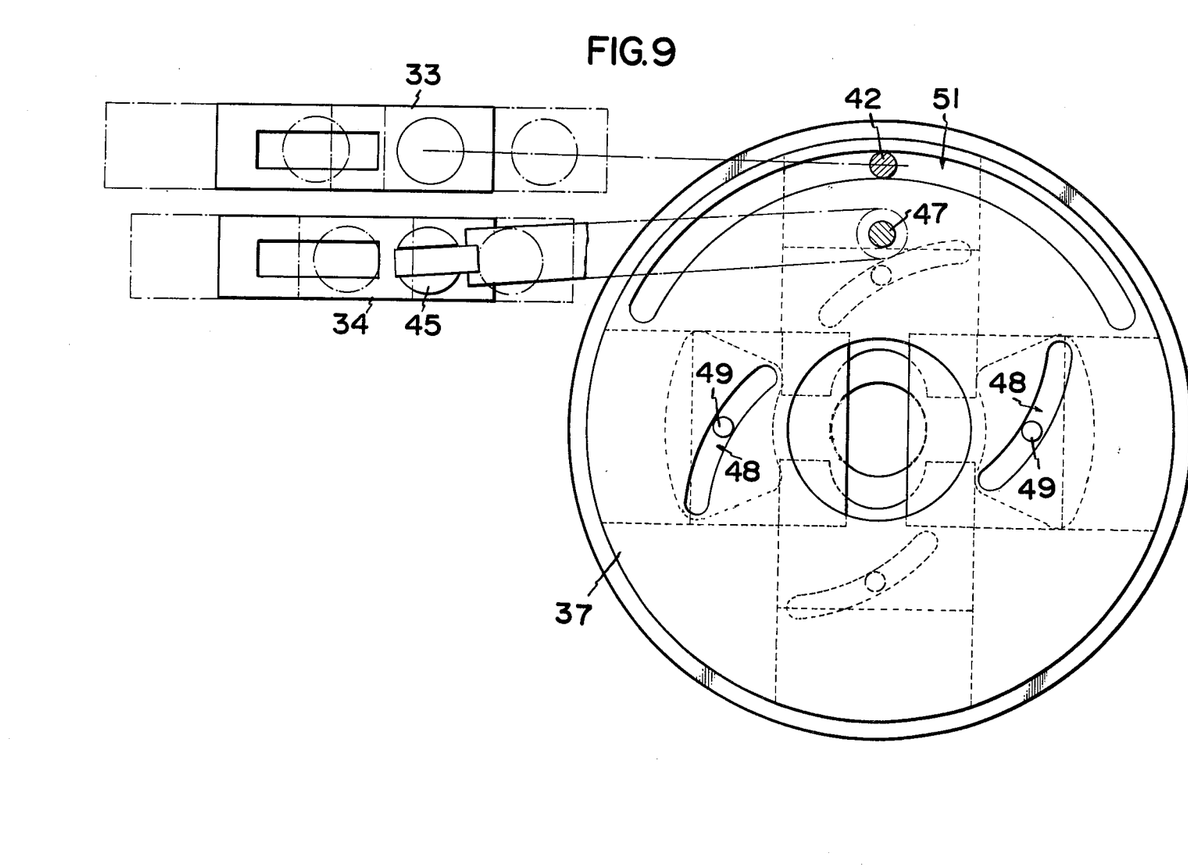
FIG. 9 is an explanatory view explaining the manner of operating the cutting plates.

A piston rod 6 has the bottom end thereof pivotally connected by a pivot pin 17 with the other end of the central tilting lever 15. The central tilting lever 15 has cam rollers 18, 19 at bifurcated end thereof and those cam rollers 18, 19 are engaged with cams 20, 21 of the cam mechanism 16. Due to the above construction, the lever 15 is tiltable employing a pivot frame 22 as a fulcrum. Numeral 23 indicates a guide sleeve for guiding the elevation of the piston rod 6. Numeral 24 indicates the left rotary shaft which receives the drive force from the power transmission shaft 13 by means of bevel gears 25, 26 positioned at the left end of the shaft 13. The left rotary shaft 24 is provided with a second cam mechanism 27 at the central position thereof which comprises a stem-forming cam 28 and a cutting-off cam 29 each of which is secured to the shaft 24. The cams 28, 29 are respectively engaged with lower bifurcated ends 30a, 31a of bifurcated transmission shafts 30, 31, which in turn, have the upper ends thereof extend upwardly from the frame structure 1. The stem-forming bifurcated transmission shaft 30 has the central portion thereof pivotably supported by a pivot pin 32 so that the shaft 30 tilts along with the rotation of the stem-forming cam 28. Such tilting of the shaft 30 imparts the reciprocating movement to a slide block 33 which is connected with the protruded portion 30b of the shaft 30 on the frame structure 1. Such reciprocation causes the slide movement of the slide block 33 toward or away from the casing 2 whereby the front and rear stem-forming plates 8, 9 are opened or closed by way of the actuating mechanisms for stem-forming and cutting-off plates (the mechanism described later). The cutting-off bifurcated transmission shaft 31, which has the central portion thereof pivotably supported by the pivot pin 32, tiltably moves along with the rotation of the cutting-off cam 29. A slide block 34 connected with the protruded portion 31b of the bifurcated transmission shaft 31, as in the case of the slide block 33, moves toward or away from the casing 2 whereby the slide block 34 opens or closes the left and right cutting-off plates 10, 11 by way of the actuating mechanism for stem-forming and cutting-off plates. The cams 28, 29 provided with the shaft 24 are angularly disposed such that the actuation of the cutting-off plates 10, 11 ensues the actuation of the stem-forming plates 8, 9 with a little time lag. FIGS. 7, 8 and 9 show the actuating mechanism for stem-forming and cutting-off plates 8, 9, 10 and 11. Such mechanism substantially comprises the casing 2a having longitudinal and lateral grooves 35, 36 on which the stem-forming plates 8, 9 as well as the cutting-off plates 10, 11 are slidably mounted respectively, the stem-forming plates 8, 9 and the cutting-off plates 10, 11, a cutting-off plate actuating disc 37 for slidably opening or closing the cutting-off plates 10, 11, said disc being mounted on the plates 8, 9, 10 and 11 and rotated by the sliding movement of the slide block 34, a stem-forming plate actuating disc 38 for slidably opening or closing the stem-forming plates 8, 9, said disc 38 being mounted on the above disc 37 and rotated by the sliding movement of the slide block 33, and a casing cover 39 which is mounted on the disc 38.

The manner in which stem-forming operation is performed according to the above construction is described with reference to FIG. 8 as follows.

First of all, the rocking movement of the bifurcated transmission shaft 30 is converted to the sliding movement of the slide block 33 towards the casing 2. Such sliding movement results in the rotation of the stem-forming plate actuating disc 38 by way of a lug provided with the slide block 33, a connecting lever 41 and a protrusion 42 which is secured to the periphery of the disc 38.

The stem-forming plate actuating disc 38 includes a pair of arc-shaped guide grooves 43 symmetrically provided relative to the center of the casing 2. Such guide grooves 43 loosely receives protrusions 44 secured to the stem-forming plates 8, 9 so that the plates 8, 9 slide to open or close the longitudinal groove 35 along with the rotation of the disc 38. As for the cutting-off operation, FIG. 9 will be of help for the following description.

Due to the oscillating movement of the bifurcated transmission shaft 31, the slide block 34 is forced to slide towards the casing 2. The sliding movement of the slide block 34 effects the rotation of the cutting-off plate actuating disc 37 by way of a lug mounted on the slide brick 34, a connecting lever 46 and a protrusion 47 provided with the disc 37. More particularly, the disc 37 includes a pair of arc-shaped guide grooves 48 provided symmetrically relative to the center of the casing 2. Such guide grooves 48 loosely receives the protrusions 47 which are secured to the cutting-off plates 10, 11.

Due to the above construction, the cutting-off plates 10, 11 slidably open or close along the lateral groove 36 with the rotation of the disc 37. In the drawins, numeral 50 indicates cut-out openings for preventing the disc 38 from contacting with the protrusion 49 during the rotation thereof. Numeral 51 indicates cut-out openings for preventing the disc 37 from contacting with the protrusion 42.

Numerals 52 and 53 indicate guide grooves which are provided on the casing cover 39 for guiding the protrusions 42, 43 respectively.

Furthermore, the left and right stem-forming plates 8, 9 are respectively provided with a semi-circular notch 54 or 55 to form a circular opening when closed and the circular opening is concentrically positioned above the pattern plate 7 which provides the decorations of a desired flower-shape.

Beside the sprocket wheel 14b, a horizontal rotary shaft 56 extends perpendicularly from the power transmission shaft 13 by means of bevel gears 57 and 58. The shaft 56 is further engaged with a vertical rotary shaft 61 at the other end thereof by way of bevel gears 59 and 60. Just below the frame structure 1, the vertical shaft 61 is provided with a spur gear 62 which is engaged with a play wheel 63 for transmitting the rotating force to the spur gear 65. The spur gear 65 is integrally secured to the support frame 64 for transmitting the rotating force to the cylinder 3 which rotates with the support frame 64.

Figure 1:
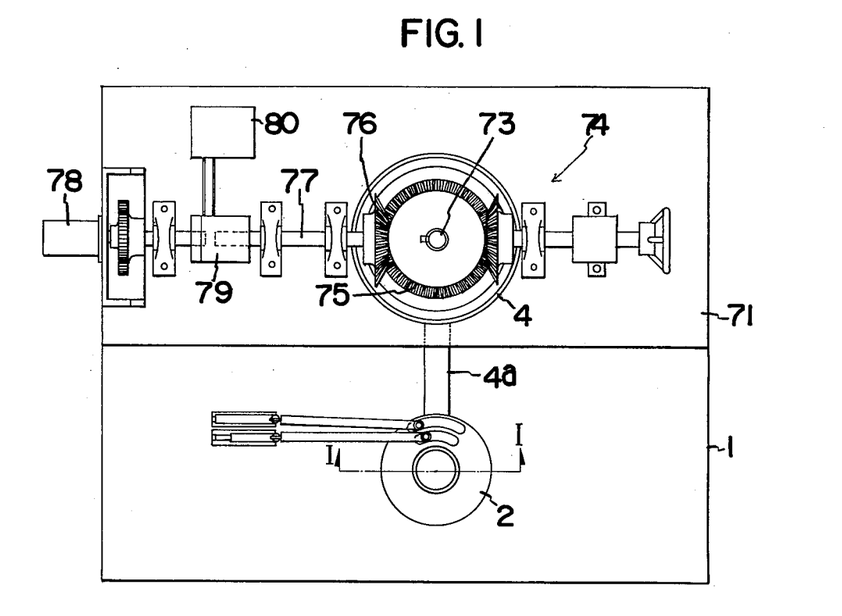
FIG. 1 is a plan view of the apparatus of the first embodiment of this invention.
Figure 2:
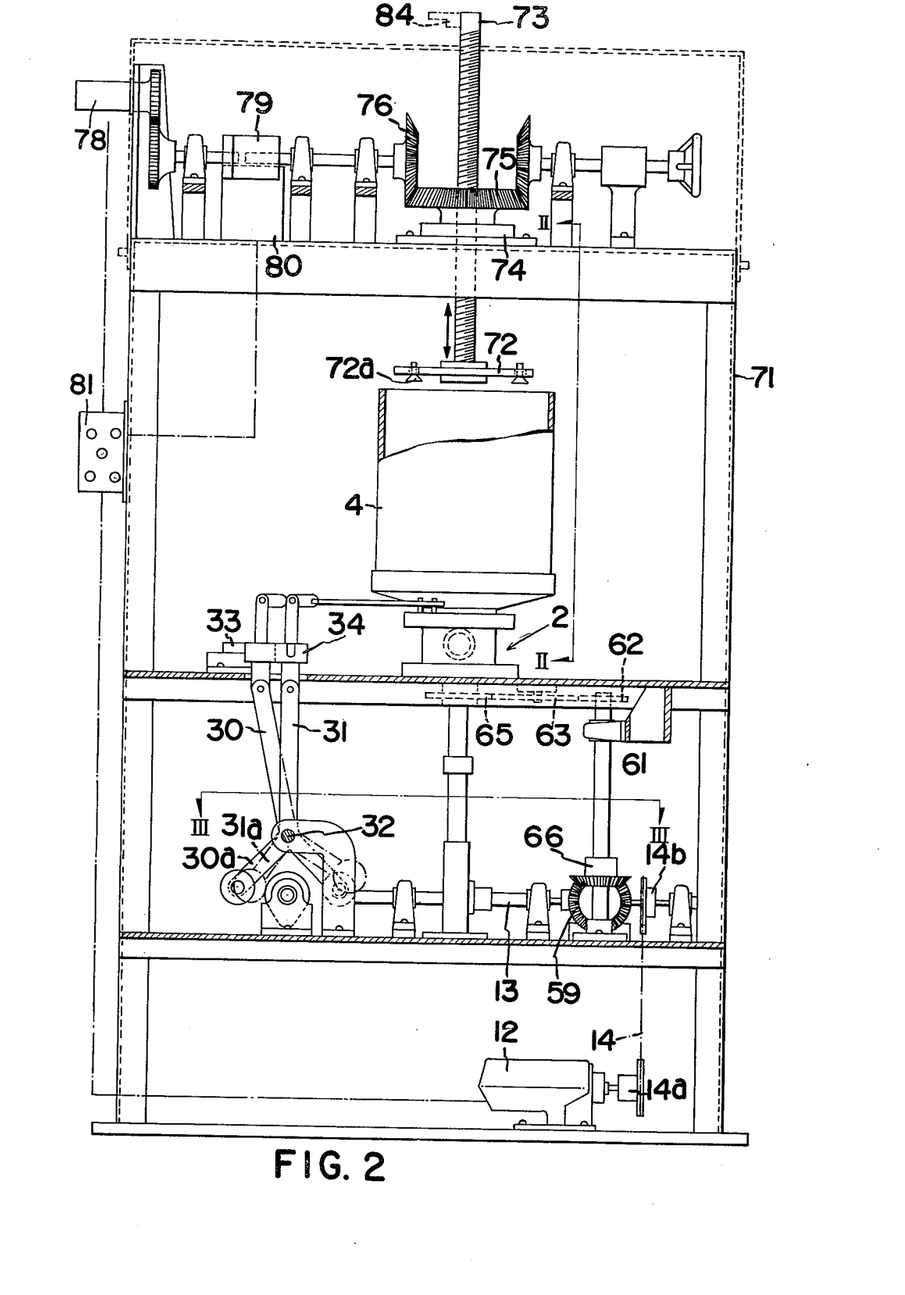
FIG. 2 is a front view of the above apparatus.
Figure 3:
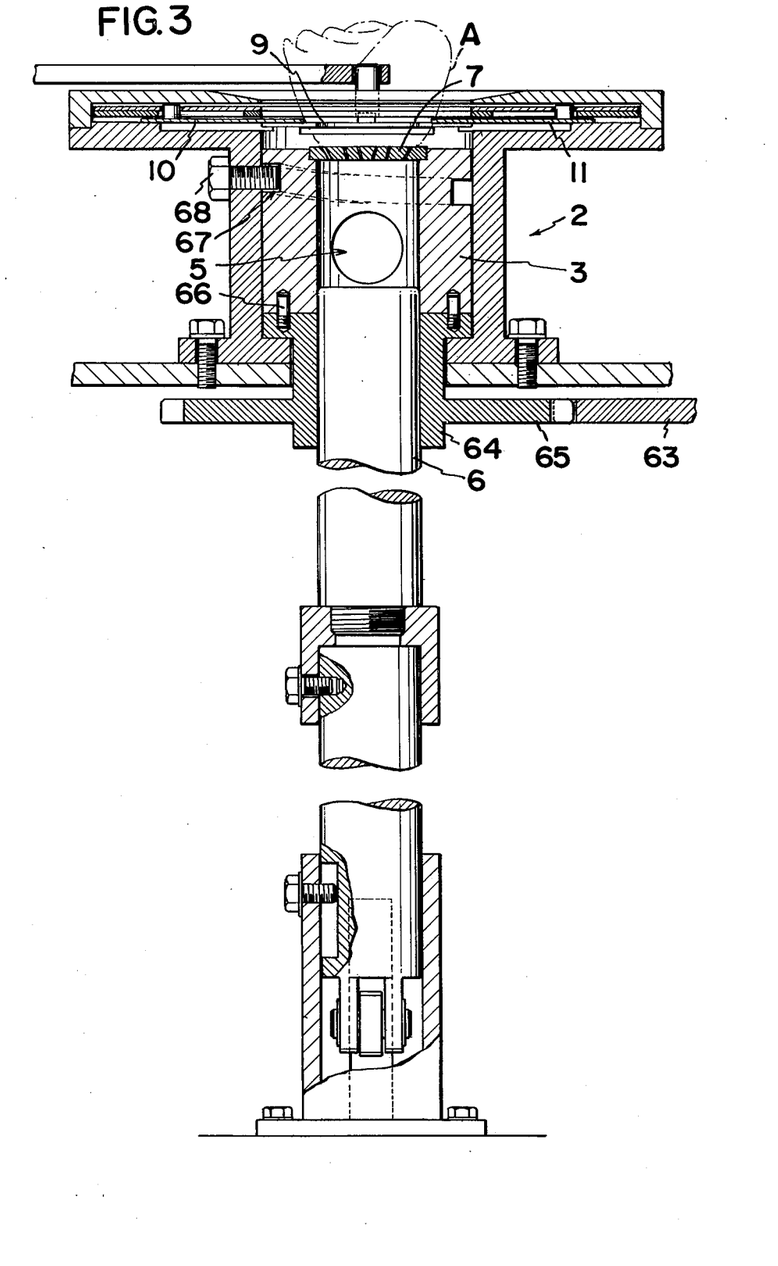
FIG. 3 is a partial cross sectional view of the apparatus taken along line I—I of FIG. 1.
Figure 4:
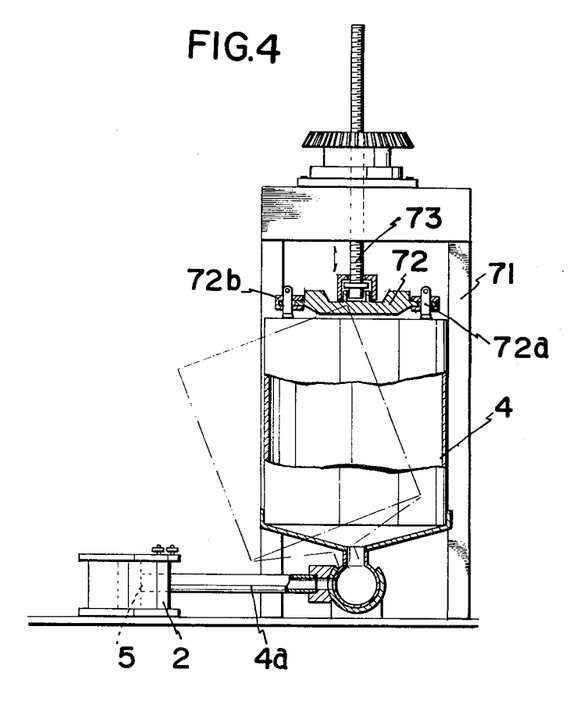
FIG. 4 is a partial cross sectional view of the apparatus taken along the line II—II of FIG. 2.
Figure 5:
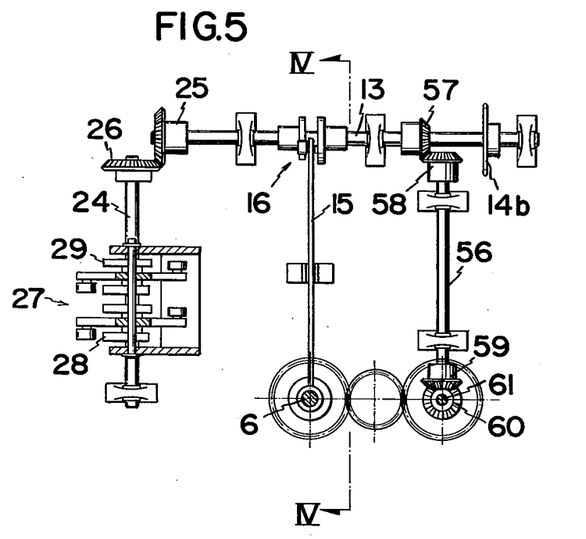
FIG. 5 is a partial cross sectional view of the apparatus taken along line III—III of FIG. 1.
Figure 6:
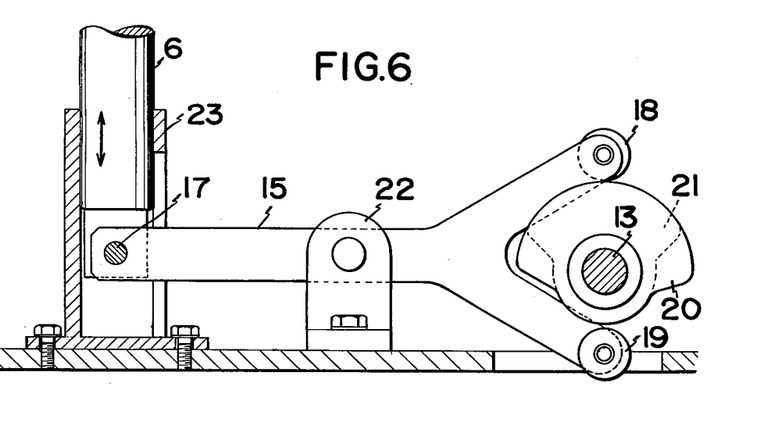
FIG. 6 is a cross sectional view of the apparatus taken along line IV—IV of FIG. 5.

As can be seen from the FIG. 3, the cylinder 3 is elevatably engaged with the support frame 64 by way of a pair of pins 66 which are mounted on the upper surface of the support frame 64. The pins 66 serve for assuring their position as well. The cylinder 3 is rotatably engaged with the casing 2 and is provided with an annular groove 67 around the outside peripheral wall thereof.

While on the inner periphery of the casing 2, an elevating protrusion 68 is provided. The elevating protrusion 68 cooperates with the annular groove 67 in a certain rotating annular zone for elevating the cylinder 3, and cooperates with the annular groove 67 in the remaining zone for lowering the cylinder 3. The pattern plate 7, which is mounted on the upper end of the cylinder 3, is concentrically and provided with a plurality of inclined concentric apertures 70 to form the desired shape of petals of flower decorations.

Under an overhead frame structure 71 constructed on the frame structure 1, the raw material supply tank 4 is tiltably mounted on the frame structure 1. Tiltable construction of the supply tank 4 provides the easy and prompt charging of material into the tank 4. The raw material supply tank 4 communicates with the opening 5 of the cylinder 3 by a communicating tube 4a, provided at the bottom of the tank 4 through the casing 2.

A threaded shaft 73 attached to the lid 72 of the tank 4 extends upward through the overhead frame structure 71 and is engaged with the lid elevating mechanism for elevating and lowering the lid 72. The lid 72 is provided with an air vent 72a and rubber packing 72b on the outer periphery of the lid 72. The lid elevating mechanism substantially comprises a bearing 74 mounted on the overhead frame structure 71, a horizontal rotary shaft 77 perpendicularly extending from the threaded shaft 73 for elevating and lowering the shaft 73 by way of bevel gears 75, 76, a power operated motor 78 for actuating the shaft 77, an electro-magnetic clutch 79 for intermittently transmitting the rotating force from the motor 78 to the shaft 77, and a timer for intermittently operating the clutch 79. The power operated motors 12, 78 and the timer 80 are electrically connected to a control panel 81. Actuation of these devices 12, 78 and 80 is described later.

Bevel gears 75 and 82 are engaged with each other to impart the manual elevating or lowering movement to the threaded shaft 73 with a manual handle 83. Furthermore, the threaded shaft 73 is provided with a stopper 84 mounted on the upper end thereof, which pushes out the limit switch to stop the power operated motor 78 when stopper 84 comes down to the lowest position.

The manner in which the apparatus of this embodiment is operated is hereinafter disclosed.

According to the first embodiment of this invention, after restoring the tilted raw material tank 4 to the original upright position, the power operated motors 13 and 78 are simultaneously actuated by the control panel 81. The rotation of the power transmission shaft 14 which is caused by the actuation of the power-operated motor 16 is transmitted to the central tilting lever 15, the left rotary shaft 24 and the right horizontal rotary shaft 56 while due to the activation of the power-operated motor 78, the horizontal rotary shaft 77 intermittently rotates by way of the electro-magnetic clutch 79 and the timer 80. The bevel gears 75 and 76 receive the rotation and convert the rotation to the linear movement of the threaded shaft 73 by way of key means embedded into the threaded shaft 73 so that the shaft 73 is intermittently lowered by a predetermined stroke. As the shaft 73 lowers a predetermined stroke, the lid 72 attached to the bottom of the shaft 73 lowers as well, and presses and charges the material within the tank 4 into the casing 2 through the communicating tube 4a as a piston. Simultaneously with the actuation of the right rotary shaft 56, the cylinder 3 within the casing 2 is rotated along with the support frame 64. Therefore, the opening 5 provided with the cylinder 3 and the communicating tube 4a intermittently communicates to allow a certain amount of material to be charged into the cylinder 3. Next, the rocking movement of the central tilting lever 15 converted from the cam mechanism 16 effects the elevation of the piston rod 6 within the cylinder 3, whereby the material in the cylinder 3 is pressurized and extruded through the inclined concentric apertures 70 of the pattern plate 7 along with the rotation of the cylinder 3 so that a flower decoration of desired shape A such as the shape of rose is produced.

Subsequently, by means of the second cam mechanism 27 and the stem-forming and cutting-off plates actuating mechanism, the stem-forming plates 8, 9 which are respectively provided with a semi-circular notch 54 or 55 are closed. The notches form a circular opening when closed and partially squeeze the base portion of the flower A onto the pattern plate 7. The further elevation of the piston rod 6 and the elevation of the cylinder 3 caused by the function of the lifting protrusion 68 forms a stem portion B of a flower decoration A.

Finally, the cutting-off plates 10, 11 which receive the drive force from the stem-forming and cutting-off plates actuating mechanism are closed to cut the stem B of the flower.

Accordingly, an operator can readily scoop the flower decoration from the stem end without incurring any damage to the flower decorations.

When the flower decoration has been taken off, the cylinder 3 and the piston rod 6, the stem-forming plates 8, 9 and the cutting-off plates 10, 11, return to their respective original positions by means of the stem-forming and cutting-off plates actuating mechanism. While, the electro-magnetic clutch 79 transmits the rotating power to the bevel gears 75, 76 to effect the corresponding rotation by a desired angle. The rotation results in the lowering of the threaded shaft 73 as well as the lid 72.

The above-mentioned operation to form a flower decoration is continuously repeated.

Second Embodiment

Figure 10:
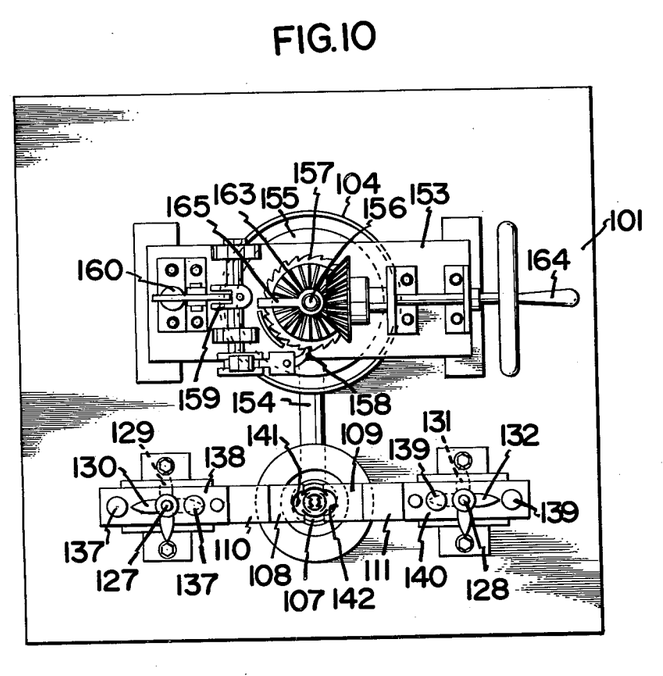
FIG. 10 is a plan view of the apparatus of the second embodiment of this invention.
Figure 11:
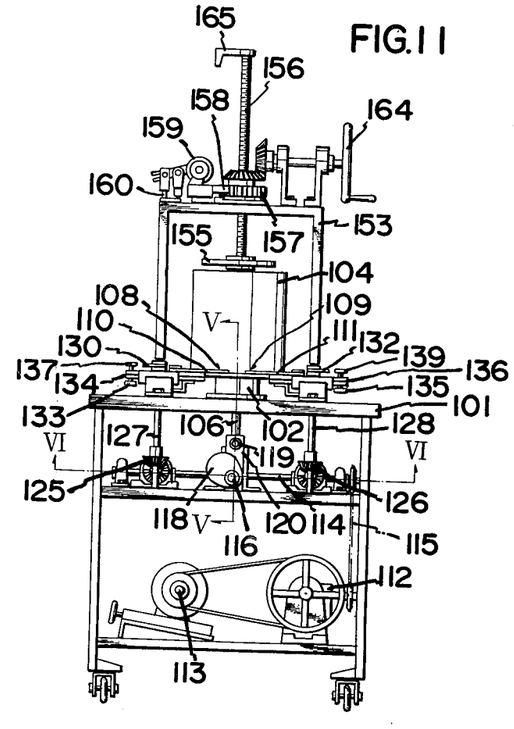
FIG. 11 is a front view of the above apparatus.
Figure 12:
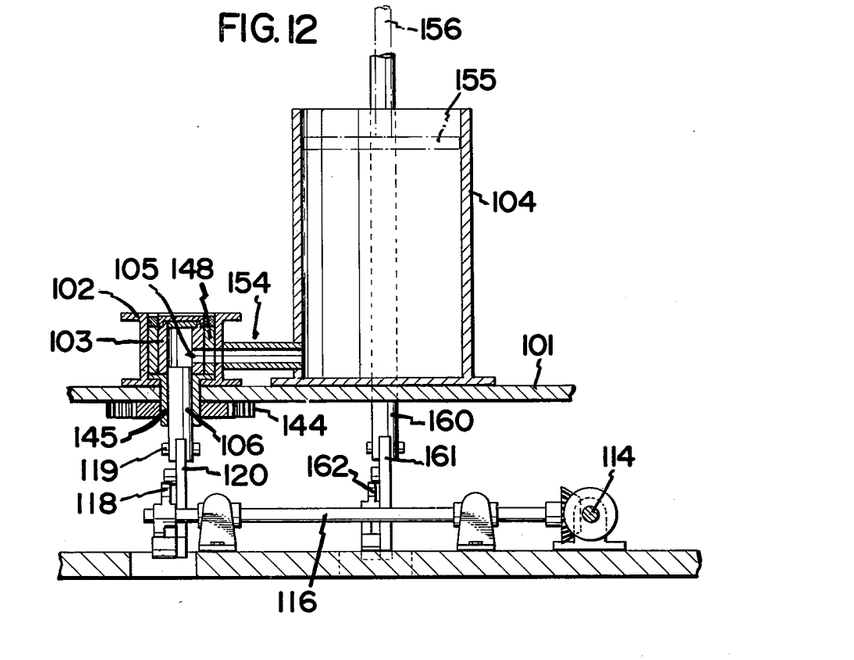
FIG. 12 is a partial cross sectional view of the apparatus taken along line V—V of FIG. 11.
Figure 13:
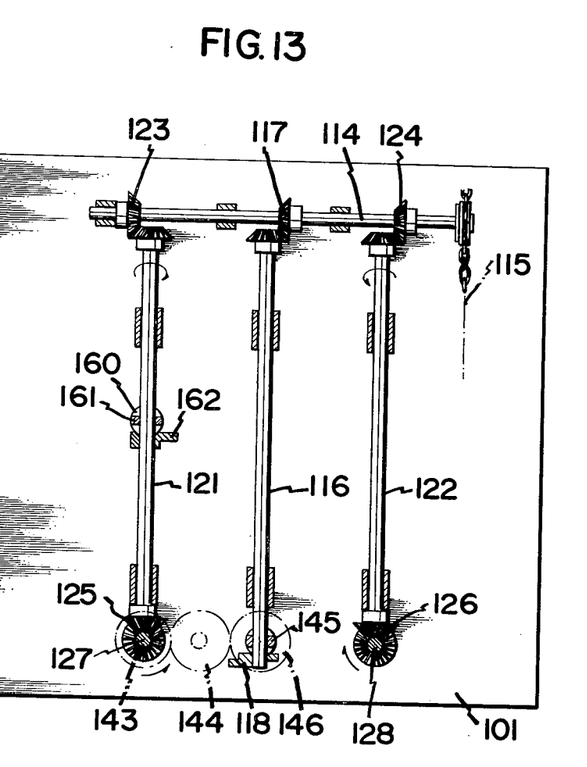
FIG. 13 is a partial cross sectional view of the apparatus taken along line VI—VI of FIG. 11.
Figure 14:
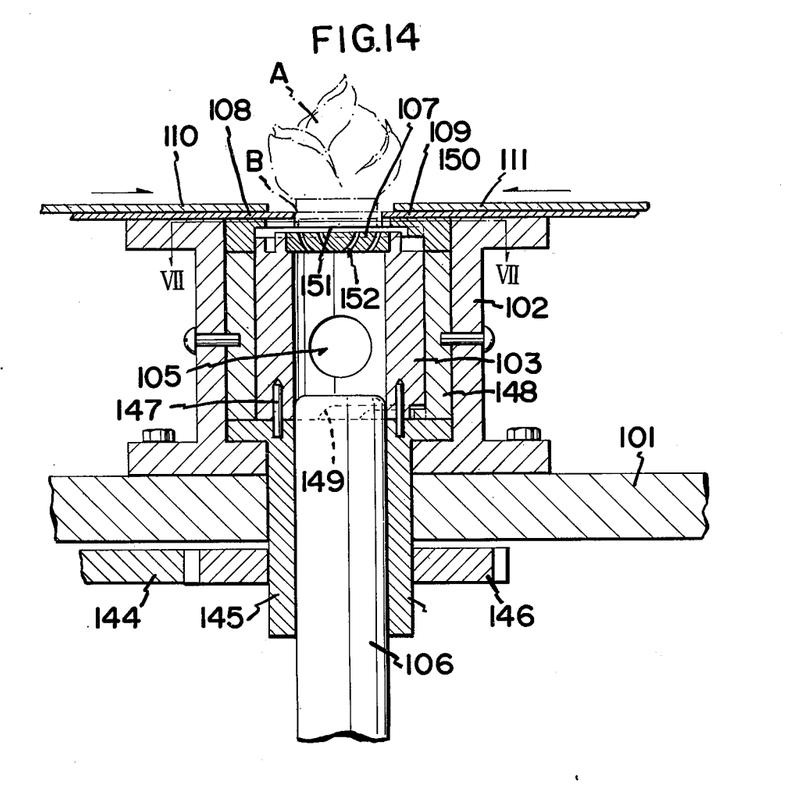
FIG. 14 is a longitudinal cross sectional view of the automatic throttling mechanism which forms a part of the apparatus.
Figure 15:
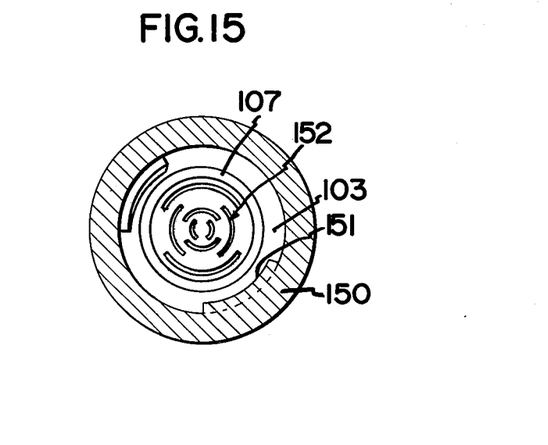
FIG. 15 is a transverse cross sectional view taken along line VII—VII of FIG. 14.

The apparatus of this embodiment is shown in FIG. 10 to FIG. 15. in FIG. 10, a frame structure 101 is provided with a circular casing 102 on the upper surface thereof. The casing 102 has a construction shown in FIG. 14, wherein a cylinder 103 is rotatably encased. A raw material supply tank 104 is also mounted on the frame structure 101. The raw material supply tank 104 is communicated with the cylinder 103 by way of a communicating tube 154 and an opening 105 formed in the wall of the cylinder 103. The raw material such as cream is intermittently supplied to the cylinder 103. A piston rod 106 is elevatably disposed in the cylinder 103. A pattern plate 107 which can produce a decoration of a desired shape is disposed above the cylinder 103. A pair of stem-forming plates 108, 109 which open or close the upper surface of the pattern plate 107 is mounted on the frame structure. A pair of cutting-off plates 110, 111 is also mounted on the frame structure 101. These cutting-off plates 110, 111 effect the closing or opening movement above the stem-forming plates 108, 109 with a little time lag from the operation of the stem-forming plates 108, 109.

In the drawings, numeral 112 indicates a reducing device for a power-operated motor 113, numeral 114 indicates a power transmission shaft which receives a drive force from the reducing device 112 by way of chains 115, numeral 116 indicates a central shaft which receives the drive force from the power transmission shaft 114 by means of bevel gears 117. The central shaft 116 is provided with a piston-rod elevating cam 118 at the output end. An elevating plate 120 is engaged with the cam 118 such that cam rollers 119 which are pivotally mounted on a pair of elevating plates 120 pinch a cam 118 therebetween. The elevating plate 120 has the upper end pivotally connected with the lower end of the piston rod 106. Numeral 121 and 122 are left and right rotary shafts which receive the rotating force from the power transmission shaft 114 at the left and right end of the power transmission shaft 114 by way of bevel gears 123 and 124. Left and right cam shafts 127 and 128 are vertically disposed at other ends of the respective shafts 121 and 122 and are rotatably engaged with respective shafts 121 and 122 by means of bevel gears 125 and 126. The cam shafts 127 and 128, furthermore, have their upper ends extended above the frame structure 101. Bevel gears 123, 124 are arranged such that the rotation of the left cam shaft 127 is the reverse of the right cam shaft 128. The left cam shaft 127 is provided with a left stem-forming plate actuating cam 129 and a left cutter-plate actuating cam 130 at the upper end thereof wherein the stem-forming plate actuating cam 129 is disposed above the cutter-plate actuating cam 130. These cams 129 and 130 are angularly displaced such that the actuation of the left cutter plate 110 takes place a little later than the actuation of the left stem-forming plate 108. The right cam shaft 128 is, in the above-mentioned manner, provided with the right stem-forming plate actuating cam 131 and the right cutter-plate actuating cam 132. Cam rollers 133 which dispose the left stem-forming plate actuating cam 129 therebetween are mounted on a mounting plate 134. The mounting plate 134 is also provided with the left stem-forming plate 108. Cam rollers 135 which dispose the right stem-forming plate actuating cam 131 are mounted on a mounting plate 136. The mounting plate 136 is also provided with the right stem-forming plate 109.

While, a mounting plate 138 on which cam rollers 137 disposing the left cutter-plate actuating cam 130 therebetween is mounted is provided with the left cutter plate 110 and a mounting plate 140 on which cam rollers 139 disposing the right cutter plate actuating cam 132 therebetween is mounted is provided with the right cutter plate 111. Semi-circular notches 141 and 142 are formed in the left and right stem-forming plates 108 and 109. When the left and right stem-forming actuating cams 129 and 131 are actuated, these stem-forming plates 108 and 109 approach each other and form a concentric circular opening above the pattern plate 107 which produces a decoration of a desired shape.

A gear train for rotating the cylinder 103 is disposed just below the frame structure 101 and comprises a spur gear 143 which is attached to the upper portion of the left cam shaft 127, a spur gear 146 which is attached to a cylinder-mounting column 145 and a play wheel which transmits the rotation of the left cam shaft 127 to the cylinder 103. The piston rod 106 is reciprocably and concentrically disposed in the cylinder-mounting column 145. The cylinder-mounting column 145 is provided with a pair of pins 147 which engages with holes formed in the bottom of the cylinder 103. Due to the above construction, the cylinder 103 is elevatable relative to the cylinder mounting column 145, although the cylinder 103 rotates along with the column 145.

A spacer ring 148 is fixedly encased in the casing 102. The cylinder 103 has the lower end surface engaged with the bottom of the spacer ring 148. A protrusion 149 is formed to the bottom of the spacer ring 148 so as to lift up the cylinder 103 within a predetermined rotating angle of the cylinder 103. A circular ring 150 is disposed above the spacer ring 148 and defines the upper movement of the cylinder 103. The circular ring 150 is provided with a protrusion 151 which lowers the cylinder 103 within a remaining rotating angle of the cylinder 103. The pattern plate 107 which is disposed above the cylinder 103 is provided with inclined concentric apertures 152 to form flower-shaped decorations A of a desired shape.

An overhead frame structure 153 is mounted on the frame structure 101. The material storage tank 104 is fixedly secured to the upper surface of the frame structure 101 below the frame structure 104. The material storage tank 104 and the opening 105 of the cylinder 103 are communicated by a communicating tube 154 by way of the casing 102 and the spacer ring 148. A threaded shaft 156 which is secured to an elevatable lid 155 of the material storage tank 104 extends above the overhead frame structure 153. A ratchet wheel 157 which engages with the threaded shaft 156 is mounted on the overhead frame structure 153.

A link mechanism for actuating the teeth 158 of the ratchet wheel 157 is also mounted on the overhead frame structure 153. Furthermore, the link mechanism 159 is provided with a spring-biased connecting rod 160. The connecting rod 160 extends downward through the frame structure 101 and is provided with a cam-roller mounting plate 161 at the lower end thereof. The plate 161 is engaged with a cam 162 secured to the middle of the left rotating shaft 121. Due to the above construction, the rotation of the shaft 121 effects the reciprocation of the ratchet wheel 157. The ratchet wheel 157 is also manually operated by means of a bevel gear 163 and a manual handle 164. The rotation of the ratchet wheel 157 provides the elevation or lowering of the threaded shaft 156. The threaded shaft 156 may be provided with a stopper 165 at the upper end thereof and the stopper 165 engages with a limit switch (not shown in the drawing) when the shaft 156 takes the lowest position and stops the actuation of the power-operated motor 113.

The manner in which the apparatus of this invention is operated is hereinafter disclosed.

A desired amount of the material such as cream is charged into the material storage tank 104. When the power-operated motor is driven, the rotation of the power-transmission shaft 114 is transmitted to the central rotary shaft and left and right rotary shafts 121 and 122. The rotation of the left rotary shaft 121 provides the rotation of a desired angle to the ratchet wheel 157 by way of the cam 162. As the ratchet wheel 157 rotates, the threaded shaft 156 is lowered and works as a piston which compressively supplies the material from the material storage tank 104 into the casing 102 by way of the communicating tube 154. Since the cylinder 103 within the casing 102 is rotated by the left rotary shaft 127 by way of the cylinder mounting column 145, the opening 105 intermittently or periodically communicates with the communicating tube 154. Accordingly, a predetermined amount of material can be charged into the cylinder 103 by way of the communicating tube 154. Subsequently, due to the rotation of the central rotary shaft 116, the piston rod elevating cam 118 is actuated so as to elevate the piston rod 106 into the cylinder 103.

Since the cylinder 103, while rotating, extrudes the cream through the inclined apertures 152 of the pattern plate 107, a decoration A of a desired shape can be produced above the pattern plate 107. Instantly after the above flower forming operation, the left and right stem-forming plate actuating cams 129 and 131 are actuated simultaneously so as to close the left and right stem-forming plates 108 and 109. Since the stem-forming plates 108 and 109 are respectively provided with semi-circular notches 141 and 142, these notches form a circular opening above the pattern plate 107 when the plates have their ends abutting to each other. Accordingly the proximal portion of the flower-shaped decoration is squeezed. As the piston rod 106 still continuously moves upward and the cylinder is independently lifted upward by the protrusion 149, the stem B of the flower-shaped decoration A is formed above the pattern plate 107. Subsequently, due to the simultaneous actuation of the left and right cutter-plate actuating cams 130 and 132, the left and right cutter plates 110, 111 approach each other and close above the pattern plate 107 so as to cut off the stem portion B of the decoration A. Accordingly, the operator can readily scoop the flower-shaped decoration A without incurring the deformation of the decoration A. Furthermore, such scooping operation unnecessitates the skilled operator.

After the decoration A is scooped in the above manner, the cylinder 103 returns to the original position by the actuation of the lowering protrusion 151 while the piston rod 106, stem-forming plates 108, 109 and cutter plates 110, 111 also return to their respective original positions by the actuation of the respective cams. Simultaneously as the cam 162 is actuated, the ratchet wheel 157 is rotated to a predetermined angle in the same direction as that of the previous flower forming operation, so that the threaded shaft 156 is lowered to a predetermined distance and the lid 155 starts the piston operation as described above. In this manner the flower forming operation is repeated.

What we claim is:

1. Apparatus for automatically producing flower-shaped decorations comprising;
   (a) a flower-forming casing fixedly mounted on a frame structure, said casing having both ends thereof open-ended,
   (b) a cylinder rotatably encased in said casing, said cylinder having a horizontal opening formed to a peripheral wall thereof,
   (c) a raw material supply tank mounted on said frame structure,
   (d) a communicating tube disposed between said casing and raw material supply tank for intermittently communicating an inner chamber of said cylinder and said raw material supply tank by way of said horizontal opening,
   (e) a pattern plate mounted on said casing, said plate having a plurality of concentric flower-forming apertures,
   (f) a piston rod elevatably disposed in said cylinder, for extruding a flower-shaped decoration through said apertures,
   (g) a pair of stem-forming plates disposed on said pattern plate, said plates having semicircular notches at corresponding inner ends, and
   (h) a pair of cutting-off plates disposed on said pattern plate.

2. Apparatus for automatically producing flower-shaped decorations according to claim 1, wherein said raw material supply tank is tiltably mounted on said frame structure.

* * * * *